United States Patent
Zigman et al.

(10) Patent No.: US 11,616,780 B2
(45) Date of Patent: *Mar. 28, 2023

(54) SECURITY PROTECTION AGAINST THREATS TO NETWORK IDENTITY PROVIDERS

(71) Applicant: CyberArk Software Ltd., Petach-Tikva (IL)

(72) Inventors: Tal Zigman, Petach-Tikva (IL); Arthur Bendersky, Petach-Tikva (IL); Sagi Eliyahu, Petach-Tikva (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 132 days.

This patent is subject to a terminal disclaimer.

(21) Appl. No.: 17/185,300

(22) Filed: Feb. 25, 2021

(65) Prior Publication Data

US 2021/0385218 A1 Dec. 9, 2021

Related U.S. Application Data

(63) Continuation of application No. 16/895,764, filed on Jun. 8, 2020, now Pat. No. 10,965,674.

(51) Int. Cl.
*H04L 9/40* (2022.01)
*H04L 9/32* (2006.01)
(Continued)

(52) U.S. Cl.
CPC .......... *H04L 63/0884* (2013.01); *G06F 21/78* (2013.01); *H04L 9/16* (2013.01);
(Continued)

(58) Field of Classification Search
CPC ....... H04L 9/3247; H04L 9/16; H04L 9/3231; H04L 9/32; H04L 63/08; H04L 63/10; H04L 63/123; H04L 63/0884; G06F 21/78

See application file for complete search history.

(56) References Cited

U.S. PATENT DOCUMENTS

| | | |
|---|---|---|
| 7,069,440 B2 | 6/2006 | Aull |
| 7,610,390 B2 | 10/2009 | Yared |
| 7,793,095 B2 | 9/2010 | Hardt |

(Continued)

OTHER PUBLICATIONS

N. Naik and P. Jenkins, "Securing digital identities in the cloud by selecting an apposite Federated Identity Management from SAML, OAuth and OpenID Connect," 2017 11th International Conference on Research Challenges in Information Science (RCIS), 2017, pp. 163-174. (Year: 2017).*

(Continued)

*Primary Examiner* — Kari L Schmidt
(74) *Attorney, Agent, or Firm* — Finnegan, Henderson, Farabow, Garrett & Dunner, LLP

(57) ABSTRACT

Disclosed embodiments relate to systems and methods for security protection against threats to network identity providers. Techniques include identifying a first request from a client for access to a secure network resource; redirecting the client to an identity provider. The identity provider may be configured to authenticate the client and provide the client with data signed using a first identity provider key. Further techniques include identifying a second request from the client, the second request including a doubly-signed version of the data, verifying the doubly-signed version of the data using a second identity provider key corresponding to the first identity provider key and a second client key corresponding to the first client key; and allowing, conditional on a result of the verifying, the client to access the secure network resource.

20 Claims, 5 Drawing Sheets

(51) Int. Cl.
*G06F 21/78* (2013.01)
*H04L 9/16* (2006.01)

(52) U.S. Cl.
CPC .............. *H04L 9/32* (2013.01); *H04L 9/3231* (2013.01); *H04L 9/3247* (2013.01); *H04L 63/08* (2013.01); *H04L 63/10* (2013.01); *H04L 63/123* (2013.01)

(56) References Cited

U.S. PATENT DOCUMENTS

| | | | |
|---|---|---|---|
| 7,836,510 B1 | 11/2010 | Angal | |
| 7,958,102 B1 | 6/2011 | Satish | |
| 8,353,015 B2* | 1/2013 | Carpenter | G06F 21/6218 713/168 |
| 8,831,993 B2 | 9/2014 | Burch | |
| 8,850,546 B1 | 9/2014 | Field | |
| 8,880,889 B1 | 11/2014 | Ward | |
| 9,064,109 B2 | 6/2015 | Smith | |
| 9,098,675 B1* | 8/2015 | Roth | H04L 63/0884 |
| 9,225,682 B2 | 12/2015 | Sarkar | |
| 9,935,937 B1 | 4/2018 | Potlapally | |
| 9,998,438 B2 | 6/2018 | Sinha | |
| 10,237,259 B2 | 3/2019 | Ronda | |
| 10,305,885 B2 | 5/2019 | Gattu | |
| 2002/0143987 A1 | 10/2002 | Sadler | |
| 2003/0130947 A1* | 7/2003 | Benantar | G06F 21/33 705/44 |
| 2007/0043948 A1 | 2/2007 | Bugbee | |
| 2008/0254893 A1 | 10/2008 | Patel | |
| 2010/0318784 A1 | 12/2010 | Rao | |
| 2010/0325441 A1 | 12/2010 | Laurie | |
| 2011/0289573 A1 | 11/2011 | Seidl | |
| 2012/0066502 A1* | 3/2012 | Borneman | G06F 21/41 713/176 |
| 2012/0131350 A1 | 5/2012 | Atherton | |
| 2013/0046972 A1 | 2/2013 | Campagna | |
| 2013/0111549 A1 | 5/2013 | Sowatskey | |
| 2014/0040987 A1 | 2/2014 | Haugsnes | |
| 2014/0181925 A1* | 6/2014 | Smith | H04L 63/0281 726/6 |
| 2014/0245412 A1 | 8/2014 | Seidl | |
| 2015/0319156 A1* | 11/2015 | Guccione | H04L 63/083 726/7 |
| 2016/0094531 A1* | 3/2016 | Unnikrishnan | H04L 63/08 726/7 |
| 2016/0205108 A1* | 7/2016 | Si | H04L 63/126 726/4 |
| 2016/0366122 A1* | 12/2016 | Rykowski | H04L 63/0815 |
| 2017/0126661 A1 | 5/2017 | Brannon | |
| 2017/0250972 A1 | 8/2017 | Ronda | |
| 2017/0279784 A1 | 9/2017 | Kent | |
| 2018/0034796 A1 | 2/2018 | Ross | |
| 2018/0287802 A1 | 10/2018 | Brickell | |
| 2018/0367310 A1 | 12/2018 | Leong | |
| 2019/0124070 A1 | 4/2019 | Engan | |
| 2019/0158481 A1 | 5/2019 | Ronda | |
| 2019/0182242 A1* | 6/2019 | Aizikovich | H04L 63/0861 |
| 2019/0260594 A1 | 8/2019 | Singhal | |
| 2019/0312730 A1 | 10/2019 | Engan | |
| 2019/0334884 A1 | 10/2019 | Ross | |
| 2020/0076601 A1 | 3/2020 | Tabrizi | |
| 2020/0112436 A1 | 4/2020 | Kanukollu | |
| 2020/0280559 A1 | 9/2020 | Wu | |
| 2022/0158846 A1* | 5/2022 | Ray | H04L 9/0825 |

OTHER PUBLICATIONS

Saman Zarandioon, Danfeng Yao, and Vinod Ganapathy. 2009. Privacy-aware identity management for client-side mashup applications. In Proceedings of the 5th ACM workshop on Digital identity management (DIM '09). Association for Computing Machinery, New York, NY, USA, 21-30. (Year: 2009).*
Golden SAML: Newly Discovered Attack Technique Forges Authentication to Cloud Apps, CyberArk, https://www.cyberark.com/resources/threat-research-blog/golden-saml-newly-discovered-attack-technique-forges-authentication-to-cloud-apps (Nov. 21, 2017).
J. K. Liu, M. H. Au, X. Huang, R. Lu and J. Li, "Fine-Grained Two-Factor Access Control for Web-Based Cloud Computing Services," in IEEE Transactions on Information Forensics and Security, vol. 11, No. 3, pp. 484-497, Mar. 2016. (Year: 2016).
Carminati, Barbara, Elena Ferrari, and Andrea Perego. "Enforcing access control in web-based social networks." ACM Transactions on Information and System Security (TISSEC) 13.1 (2009): 1-38. (Year: 2009).
Z. A. Khattak, S. Sulaiman and J. A. Manan, "A study on threat model for federated identities in federated identity management system," 2010 International Symposium on Information Technology, Kuala Lumpur, 2010, pp. 618-623, (Year: 2010).

* cited by examiner

SECURITY PROTECTION AGAINST THREATS TO NETWORK IDENTITY PROVIDERS

CROSS-REFERENCE TO RELATED APPLICATIONS

This application is a continuation of U.S. patent application Ser. No. 16/895,764, filed on Jun. 8, 2020. The aforementioned application is incorporated herein by reference in its entirety.

BACKGROUND

Computer systems often include a variety of secure resources to which access is limited in order to improve system security. Access to such resources is often managed using identities, which are granted specific permissions or privileges to access, edit, or utilize the secure resources. While restricting access to secure resources using permissions may improve the security of a system, the identities and permissions may become cumbersome to manage in large or dynamically changing systems. As the size of systems and the number of users working remotely increases, management of a system's identities becomes even more difficult. Other security measures such as multi-factor authentication or single sign-on schemes may add additional complexity to credential management.

Identity management services may manage identities for an organization so that the organization does not have to protect, store, and manage a large number of individual identities. While providing a valuable service to large organizations, these identity providers could present a significant security risk to the organization if the identity provider is compromised. For example, if an attacker compromises an identity provider, the attacker may be able to effectively create an identity with any level of privileges within the organization's system. Thus, a compromised identity provider may have the potential to cause great harm to an organization.

Accordingly, in view of these and other deficiencies, technological solutions are needed for analyzing and grouping identities for security protection against threats to network identity providers. Solutions should be able to prevent an attacker from gaining access to an organization's system by merely compromising an identity provider.

SUMMARY

The disclosed embodiments describe non-transitory computer readable media, systems, and methods for security protection against threats to network identity providers. For example, in an exemplary embodiment, there may be a non-transitory computer readable medium including instructions that, when executed by at least one processor, may cause the at least one processor to perform operations for secure and efficient communications between clients and secure network resources. The operations may comprise identifying a first request from a client for access to a secure network resource; redirecting the client to an identity provider, wherein the identity provider is configured to: authenticate the client, and provide the client with data signed using a first identity provider key; identifying a second request from the client, the second request including a doubly-signed version of the data, which is the data signed using the first identity provider key and also signed using a first client key; verifying the doubly-signed version of the data using a second identity provider key corresponding to the first identity provider key, and a second client key corresponding to the first client key; and allowing, conditional on a result of the verifying, the client to access the secure network resource.

According to a disclosed embodiment, the client may be configured to receive a signed version of the second client key from a trustee resource, the signed version of the second client key having been signed using a first trustee resource key.

According to a disclosed embodiment, the operations may further comprise receiving the signed version of the second client key together with the doubly-signed version of the data.

According to a disclosed embodiment, the operations may further comprise verifying the signed version of the second client key using a second trustee resource key corresponding to the first trustee resource key.

According to a disclosed embodiment, allowing the client to access the secure network resource may also be conditional on a result of verifying the signed version of the second client key.

According to a disclosed embodiment, the client may be configured to store the first client key in a secure memory environment on a computing resource of the client.

According to a disclosed embodiment, the client may be configured to generate the first client key and second client key as part of an enrollment process in a network environment including the secure network resource According to a disclosed embodiment, the first client key may be based on at least one of: biometric data or biological data.

According to a disclosed embodiment, the identity provider may be further configured to redirect the client to the secure network resource.

According to a disclosed embodiment, the redirect from the identity provider may be part of a communication to the client that also includes the data signed using the first identity provider key.

According to another disclosed embodiment, a method may be implemented for secure and efficient communications between clients and secure network resources. The method may comprise identifying a first request from a client for access to a secure network resource; redirecting the client to an identity provider, wherein the identity provider is configured to: authenticate the client, and provide the client with data signed using a first identity provider key; identifying a second request from the client, the second request including a doubly-signed version of the data, which is the data signed using the first identity provider key and also signed using a first client key; verifying the doubly-signed version of the data using a second identity provider key corresponding to the first identity provider key, and a second client key corresponding to the first client key; and allowing, conditional on a result of the verifying, the client to access the secure network resource.

According to a disclosed embodiment, the client may be configured to receive a plurality of signed versions of the second client key from a plurality of trustee resources, the plurality of signed versions of the second client key having been signed using a plurality of first trustee resource keys of the plurality of trustee resources According to a disclosed embodiment, the method may further comprise receiving the plurality of signed versions of the second client key and verifying the plurality of signed versions of the second client key using a plurality of second trustee resource keys corresponding to the plurality of first trustee resource keys.

According to a disclosed embodiment, the method may further comprise maintaining a plurality of second identity provider keys corresponding to a plurality of first identity provider keys maintained by a plurality of identity providers.

According to a disclosed embodiment, the client may be configured to receive a signed version of the second client key from a trustee resource, the signed version of the second client key having been signed using a first trustee resource key.

According to a disclosed embodiment, the signed version of the second client key may have an expiration attribute.

According to a disclosed embodiment, the signed version of the second client key may have a number-of-use limitation.

According to a disclosed embodiment, the signed version of the second client key may be based on a network security policy.

According to a disclosed embodiment, the trustee resource may be part of the same network as the secure network resource.

According to a disclosed embodiment, the trustee resource may be maintained by a third-party service provider.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
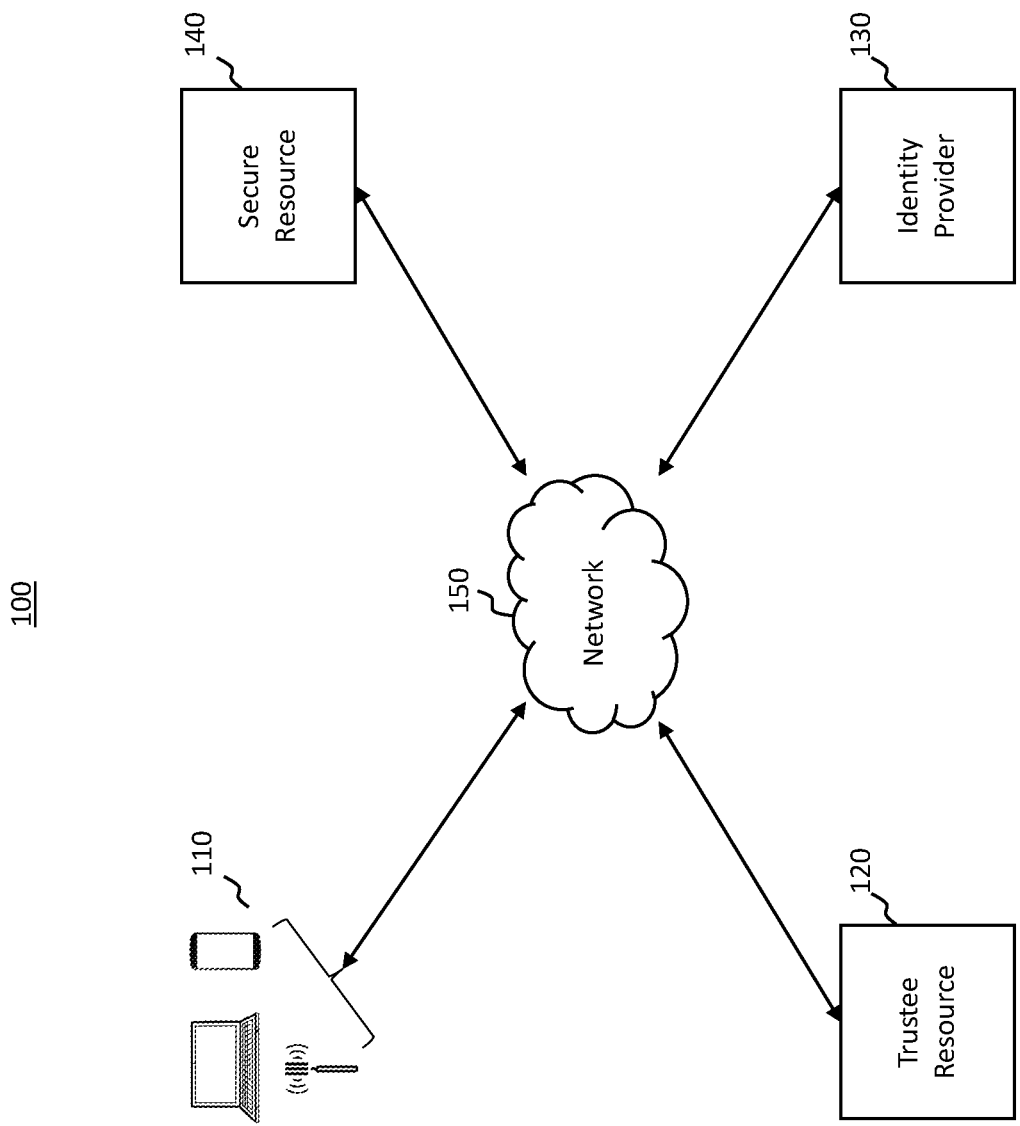
FIG. 1 is a block diagram of an exemplary system for secure network communications in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The techniques of secure and efficient communications between clients and secure network resources described herein overcome several technological problems relating to the management of permissions and security of computing systems. As described below, the disclosed embodiments provide techniques for a client device to gain access to a secure resource using access data obtained from an identity provider. In some embodiments, the secure resource may use the access data only if multiple digital signatures can be verified using keys obtained from multiple sources.

Computer systems often include a variety of secure resources to which access is limited in order to improve system security. A system may include a variety of identities associated with human users, applications, virtual instances, or code instances. The identities may be granted specific permissions or privileges to execute certain actions on the secure resources. For example, privileges may permit the identity to read data, write or edit data, access an application, create new identities, or otherwise utilize a secure resource. In some situations, the privileges may be defined according to policies or directories (e.g., Microsoft Active Directory™, AWS Identity and Access Management™ (IAM), Azure AD™, etc.).

For systems with a large number of identities and permissions, managing the identities can become quite cumbersome. Not only do the identities have to be identified and assigned privileges, but the identities, their credentials, and corresponding privilege assignments must be stored and kept up to date. As the size of a system increases, management of identities becomes even more difficult. Other factors, such as an increased number of remote access users, implementation of multi-factor authentication, single sign-on access, etc., may add even more complexity and difficulty to identity and credential management.

Identity management services may manage identities for an organization so that the organization does not have to protect, store, and manage a large number of individual identities. The identity provider may receive a request from a user to access an organization's system or a secure resource within the system. The user may also provide authentication credentials to the identity provider. After authenticating the user, the identity provider may send access data (e.g., in the form of a Security Assertion Markup Language (SAML) object) to the user's device, which the user may send to the secure resource to gain access. In some cases, the access data may be digitally signed by the identity provider. The secure resource may validate this digital signature to ensure that the access request from the user's device is legitimate, and then grant the user access to the resource.

While providing a valuable service to large organizations, these identity providers could present a significant security risk to the organization if the identity provider is compromised. For example, if an attacker compromises an identity provider, the attacker may be able to effectively create an identity with any level of privileges within the organization's system. One example of such an attack has been called the "Golden SAML" attack. This attack could be implemented by an attacker who compromises an identity provider and gains access to the key that the identity provider uses to sign its access data. Thus, the attacker could sign fake access data using the identity provider's key and use the fake access data to gain access to a company's system. The attacker could define his desired level of privileges in the fake SAML object, thus effectively having the ability to gain any level of access to the secure resource that he desires.

Disclosed embodiments address security risks presented by such attacks. Disclosed embodiments protect against a compromised identity provider by providing another layer of security through utilization of another resource. This third resource, a trustee resource, may validate a user using a different set of credentials than those used by the identity provider. The trustee resource may then provide an additional digital signature that the secure resource must validate before the secure resource can verify that the access data received is legitimate. Accordingly, an attacker would not be able to gain access to the secure resource by compromising only the identity provider because the attacker would not have the key from the trustee resource needed to create an additional digital signature that would be validated by the secure resource. Accordingly, disclosed embodiments may provide additional security protection against threats to network identity providers by preventing access to a secure resource, even in situations when the identity provider is compromised.

As described below, disclosed embodiments may use private and public key pairs to generate digital signatures applied to data or other keys. It is understood that such digital signatures may be created using a variety of asymmetric or public-private key encryption methods (for example, Diffie-Hellman, RSA, DSA, etc.).

Reference will now be made in detail to the disclosed embodiments, examples of which are illustrated in the accompanying drawings.

FIG. 1 is a block diagram of an exemplary system 100 for secure network communications in accordance with disclosed embodiments. System 100 may include one or more client device 110, trustee resource 120, identity provider 130, secure resource 140, and network 150, as shown in FIG. 1 and discussed further below.

Client device 110 may include a variety of different types of computing devices. For example, client device 110 may be a personal computer (e.g., a desktop or laptop), an IoT device (e.g., sensor, smart home appliance, printer, connected vehicle, industrial device, etc.), a server, a virtual machine (e.g., virtualized computer, container instance, etc.), or similar. Client device 110 may also be a handheld device (e.g., a mobile phone, a tablet, notebook, digital camera, etc.), a wearable device (e.g., a smart watch, smart jewelry, an implantable device, a fitness tracker, smart clothing, a head-mounted display, etc.), or various other devices capable of processing and/or receiving data. Client device 110 may include one or more processors and one or more storage devices. In some embodiments, client device 110 may include a secure enclave (e.g., a hardware based key manager) for generating and/or storing key pairs.

In accordance with disclosed embodiments, computing device 110 may be associated with one or more identities. An identity may correspond to, for example, a human user, user account, application, or code instance. Each identity may be associated with one or more permissions, which may permit an identity access to restricted resources, execute code on a restricted resource, access or edit certain data, create new permissions or identities, or execute other actions.

System 100 may also include a trustee resource 120 as shown in FIG. 1. Trustee resource 120 may be a server, personal computer, mobile device, virtual computer, or other computing device. Trustee resource 120 may also be a cloud-based software service or code instance. In some embodiments, trustee resource 120 may be an application (e.g., CyberArk Alero™) or code instance executed on a computing device. Trustee resource 120 may include one or more pairs of trustee keys, which may be used to create or validate digital signatures, as described below. In some embodiments, trustee resource 120 may generate the trustee keys. In some cases, trustee public key 221 (discussed below) may be sent to secure resource 140 after it is generated and may not be stored locally on the device. In some embodiments, trustee resource 120 may include a secure storage area or secure enclave in which one or more trustee keys may be stored. In some embodiments (e.g., when trustee resource 120 is an application on a computing device such as client device 110), trustee keys may be stored in memory or a secure enclave of the computing device. As an example, trustee keys may be generated and stored in a secure enclave of client device 110.

In some embodiments, trustee resource 120 may be associated with, or a part of, identity provider 130 or secure resource 140. In some embodiments, trustee resource 120 may be associated with a company or service associated with identity provider 130 or secure resource 140. For example, the same service may provide both the trustee resource 120 and identity provider 130. As another example, trustee resource 120 and secure resource 140 may be parts of the same network. In other embodiments, trustee resource 120 may be a third-party device or service. A described in greater detail below, trustee resource 120 may be used to authenticate a user of client device 110 and digitally sign a public key associated with client device 110.

System 100 may also include an identity provider 130 ("IdP"), as shown in FIG. 1. Identity provider 130 may be a server, personal computer, virtual computer, or other computing device. Identity provider 130 may manage identities associated with one or more components of system 100. For example, identity provider 130 may store and authenticate credentials of users (e.g., a user associated with client device 110) that are used to access secure resource 140. In some cases, identity provider 130 may be a third-party identity management service (e.g., CyberArk Core Privilege Access Security™, Microsoft's Active Directory Federation Services™, AWS AIM™, Azure AD™, Okta™, or others). Such services may manage credentials for access to secure resources 140 associated with, for example, another organization, website, or service, etc. independently so that secure resource 140 need not manage the credentials of its authorized users. Identity provider 130 may authenticate a user and provide an indication to secure resource 140 of the authentication, which secure resource 140 may use to grant access to the user. Authentication may occur, for example, through the use of a privileged credential (e.g., password, SSH key, symmetric (e.g., public/private) key, or other type of cryptographic data or privileged access token). In some embodiments, identity provider 130 may identify different levels of identities that may be recognized by secure resource 140. Each level may be associated with certain privileges. For example, there may be 3 levels of identities recognized by secure resource 140, each with its own unique set of privileges. When identity provider 130 authenticates a user, it may indicate to secure resource 140 what type or level of identity the user is. Then, secure resource 140 may use the level indication to identify which privileges to grant to the now-authenticated user (i.e., what actions it will permit the user to execute on the secure resource).

System 100 may also include a secure resource 140. Secure resource 140 may include various computing resources, storage resources, security services, applications, databases, software code, files, or various other types of resources. In some embodiments, secure resource 140 may include one or more networks, which may be associated with an organization, service, etc. In some cases, secure resource 140 may include a variety of real-world devices, in some cases secure resource 140 may exist entirely in the cloud. Access to secure resource 140 may be restricted to prevent access to unauthorized identities. Accordingly, authorized identities may be associated with a variety of privileges that permit the authorized identities to take various actions on secure resource 140, for example, reading data, storing data, deleting data, executing code, or creating other identities.

Computing device 110, trustee resource 120, identity provider 130, and secure resource 140 may communicate through one or more network 150. Communications over network 150 may occur across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, network 150 may be a cloud network, (e.g., private cloud, public cloud, or hybrid cloud network), or a combination of these types of networks. In some embodiments, the communications may take place across two or more of these forms of networks and protocols.

Figure 2:
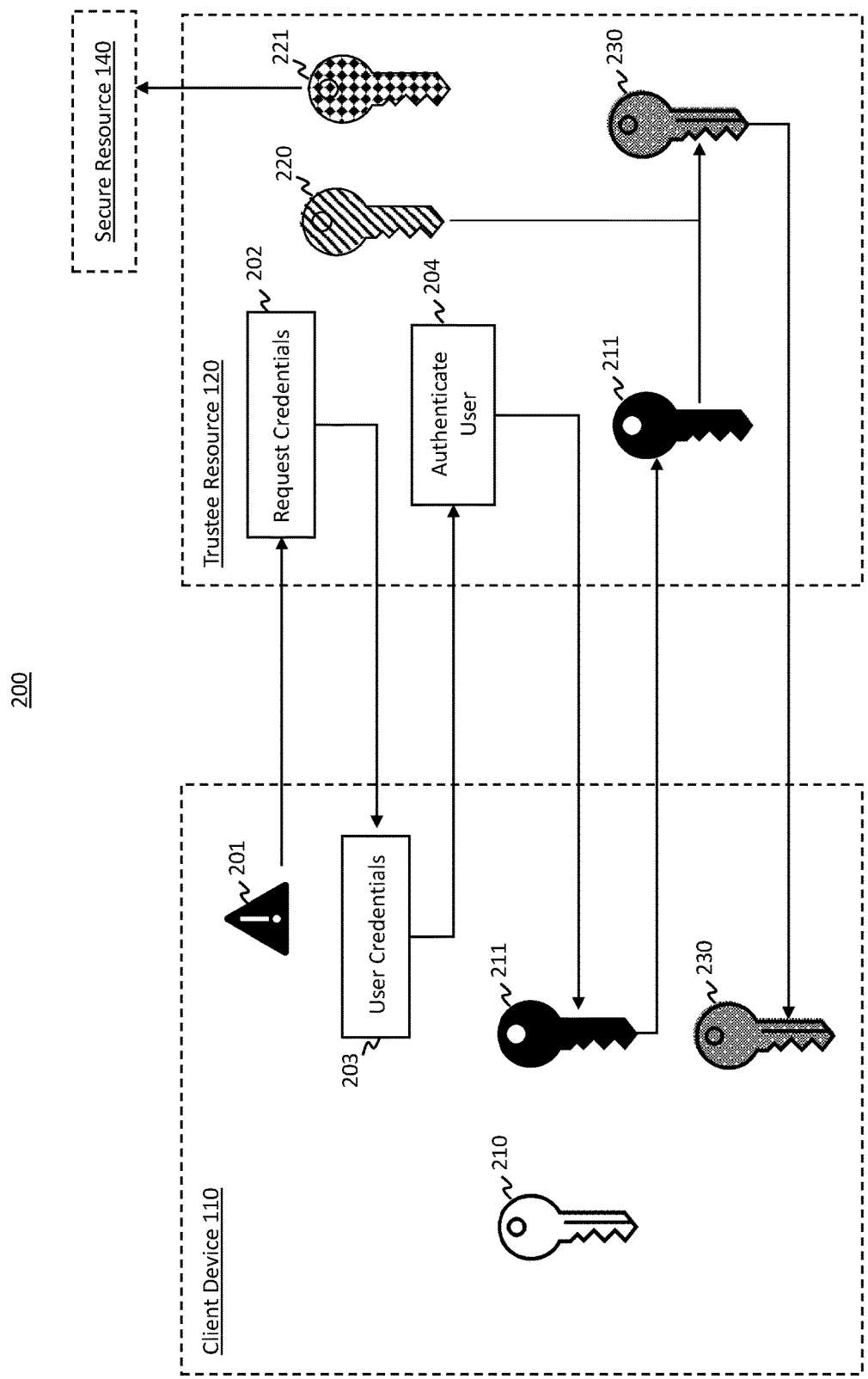
FIG. 2 is a block diagram of an exemplary process for digitally signing a client key in accordance with disclosed embodiments.

FIG. 2 is a block diagram of an exemplary process 200 for digitally signing a client key in accordance with disclosed embodiments. Process 200 may be triggered in response to client device 110 requesting access to secure resource 140 and may, in some embodiments, occur automatically. In other embodiments, a user of client device 110 may manually trigger process 200 by, for example, sending a request or a private key to trustee resource 120.

Client device 110 may use process 200 to receive a signed client public key 230, which it may then send to secure resource 140, as described in greater detail below with respect to FIGS. 4 and 5. Client device 110 may include a client key pair comprising a client private key 210 and a client public key 211. The client private key 210 and/or client public key 211 may be stored locally in memory on client device 110. In some embodiments, client private key 210 and/or client public key 211 may be stored in a secure memory environment on a computing resource of the client. For example, the keys may stored in a password-protected or otherwise secured memory partition or connected storage device. In some embodiments, client device 110 may dynamically generate client private key 210 and client public key 211 each time a user of client device 110 requests access to secure resource 140.

In some embodiments, the client private key 210 or client public key 211 may be based on biometric data or biological data (e.g., a fingerprint, facial scan, eye scan, voice recording, and the like).

In further embodiments, client device 110 may be configured to generate client private key 210 and client public key 211 as part of an enrollment process in a network environment including the secure resource 140. For example, a user of client device 110 may wish to become an authorized user with access to secure resource 140. The user may have to complete an enrollment process with secure resource 140 or identity provider 130. The enrollment process may include providing identification or authentication information to secure resource 140 or identity provider 130, which may be used to ensure that the user should be granted access to secure resource 140. As a part of this enrollment process, the user's client device 110 may generate client private key 210 and client public key 211. In some embodiments, the enrollment process may also include installing an application associated with identity provider 130 on client device 110. Similarly, in some embodiments, the user of client device 110 may enroll with trustee resource 120.

Client device 110 may send an authentication request 201 to trustee resource 120. Upon receiving authentication request 201, trustee resource 120 may send a message requesting credentials 202 to client device 110. In response, client device 110 may provide credentials of a user associated with client device 110 to trustee resource 120. In some embodiments, user credentials 203 may be stored on client device 110. In other embodiments, client device 110 may receive all or a portion of user credentials 203 from a user of client device 110. User credentials 203 may be, for example, a username and password, a personal identification number, or biometric data (e.g., a fingerprint, facial scan, eye scan, voice recording, and the like). In some embodiments, trustee resource 120 may implement multi-factor authentication to authenticate a user.

Upon receiving user credentials 203, trustee resource 120 may authenticate the user at step 204. Trustee resource 120 may authenticate the user by verifying the user credentials 203 by comparing the received user credentials 203 with stored user credentials. In some embodiments, trustee resource 120 may store the user credentials for comparison locally. In other embodiments, trustee resource 120 may receive the comparison credentials from identity provider 130 or from other remote storage.

Upon verification of the credentials trustee resource 120 may authenticate the user and request client public key 211 from client device 110. Client device 110 may then send client public key 211 to trustee resource 120.

Trustee resource 120 may include a trustee key pair, comprising a trustee private key 220 and a trustee public key 221. Trustee private key 220 and trustee public key 221 may be used to apply and verify digital signatures substantially as described above with respect to other public/private key pairs. Trustee resource 120 may use trustee private key 220 to digitally sign client public key 211 to create signed client public key 230. Trustee resource 120 may send signed client public key 230 to client device 110.

In some embodiments, the digital signature of signed client public key 230 may be valid indefinitely. In other embodiments, the digital signature may include an expiration attribute that indicates that the signature is valid for a limited period of time. For example, the signature may expire after 1 hour has elapsed after the client public key was signed. In such a case, if the secure resource 140 does not attempt to validate the signature before the hour has elapsed, secure resource 140 may be unable to validate the signature, and therefore unable to authenticate the user of client device 110. Additionally, or alternatively, the digital signature may be valid for a number of uses. For example, the digital signature may be valid until client device 110 has used it to authenticate with secure resource 140 on five occasions. Thus, upon the fifth authentication, the digital signature may cease to be valid, requiring client device 110 to repeat process 200 to obtain a new digitally signed client public key 230. Authentication of client device 110 with secure resource 140 is discussed in greater detail below with respect to FIGS. 5 and 6.

In some embodiments, signed client public key 230 may be based on a network security policy. A network security policy may identify for example, whether keys should be rotated over time after a certain number of uses. Further, a network security policy may instruct that keys should be replaced based on detection of suspicious or potentially malicious network events (e.g., involving an identity, client device 110, secure resource 140, etc.). In additional embodiments, the type of encryption used for public key 230 may be selected by a network security policy.

Trustee resource 120 may send trustee public key 221 to secure resource 140. Secure resource 140 may then use trustee public key 221 to verify the digital signature of signed client public key, as described below with respect to FIGS. 5 and 6. In some embodiments, trustee resource 120 may no longer store trustee public key 221 after sending it to secure resource 140. Accordingly, in such cases, the trustee public key 221 may only be stored on secure resource 140.

While FIG. 2 illustrates a single pair of client keys and a single pair of trustee keys, it is understood that client device 110 and/or trustee resource 120 may include additional key pairs. For example, trustee resource 120 may include additional pairs of trustee private keys and trustee public keys. In such cases, trustee resource 120 may digitally sign client public key 211 with multiple different trustee private keys 220, thus creating multiple different versions of signed client private key 230. Trustee resource 120 may send each of the different signed client private keys to client device 110.

Figure 3:
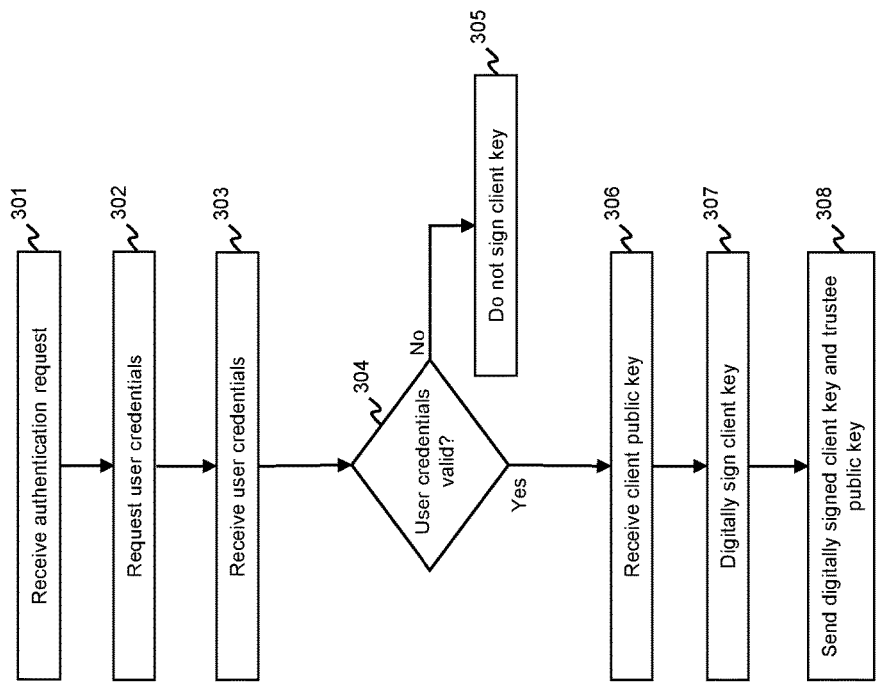
FIG. 3 is a flowchart depicting an exemplary process for digitally signing a client key in accordance with disclosed embodiments.

FIG. 3 is a flowchart depicting an exemplary process 300 for digitally signing a client key in accordance with disclosed embodiments. Process 300 may be executed by trustee resource 120. Process 300 may correspond to parts of process 200 shown in FIG. 2 and, accordingly descriptions of the components and processes therein may apply to process 300 as well. Process 300 may be triggered, for example, in response to trustee resource 120 receiving an authentication request or a client key from client device 110. Process 300 may also be triggered by trustee device 120 receiving a communication from secure resource 140 or identity provider 130.

At step 301, process 300 may include receiving an authentication request. For example, trustee device 120 may receive a communication from client device 110 requesting to be authenticated by the trustee device 120. In some embodiments, step 301 may include receiving a communication from secure resource 140 or identity provider 130 requesting authentication of the client device 110.

At step 302, process 300 may include requesting user credentials. In some embodiments, trustee device 120 may request user credentials from client device 110 in response to receiving the authentication request. As described above, user credentials may be, for example, a username and password, a personal identification number, or biometric data (e.g., a fingerprint, facial scan, eye scan, voice recording, and the like). In some embodiments, trustee resource 120 may implement multi-factor authentication to authenticate a user.

At step 304, trustee resource 120 may determine if the user credentials are valid. As described above, trustee resource 120 may determine if the user credentials are valid by comparing the user credentials received at step 303 with one or more stored sets of user credentials. In some embodiments, trustee resource 120 may store the user credentials for comparison locally. In other embodiments, trustee resource may receive the comparison credentials from identity provider 130 or from other remote storage.

If the user credentials are not valid, trustee resource 120 may not authenticate the user and, at step 305, may not sign the client public key 211.

If the user credentials are valid, trustee resource 120 may proceed to step 306 and receive the client public key 211 from client device 110. In some embodiments, trustee resource 120 may receive client public key 211 in response to sending a request for client public key 211 to client device 110. In other embodiments, trustee resource 120 may receive client public key 211 with user credentials at step 303.

At step 307, trustee resource 120 may digitally sign client public key 211. Trustee resource 120 may digitally sign client public key 211 using trustee private key 220. As described above, the digital signature may be valid indefinitely, for a certain period of time, or for a certain number of uses. At step 308, trustee resource 120 may send digitally signed client public key 230 back to client device 110. In some embodiments, step 308 may include sending trustee public key 221 to secure resource 140.

Figure 4:
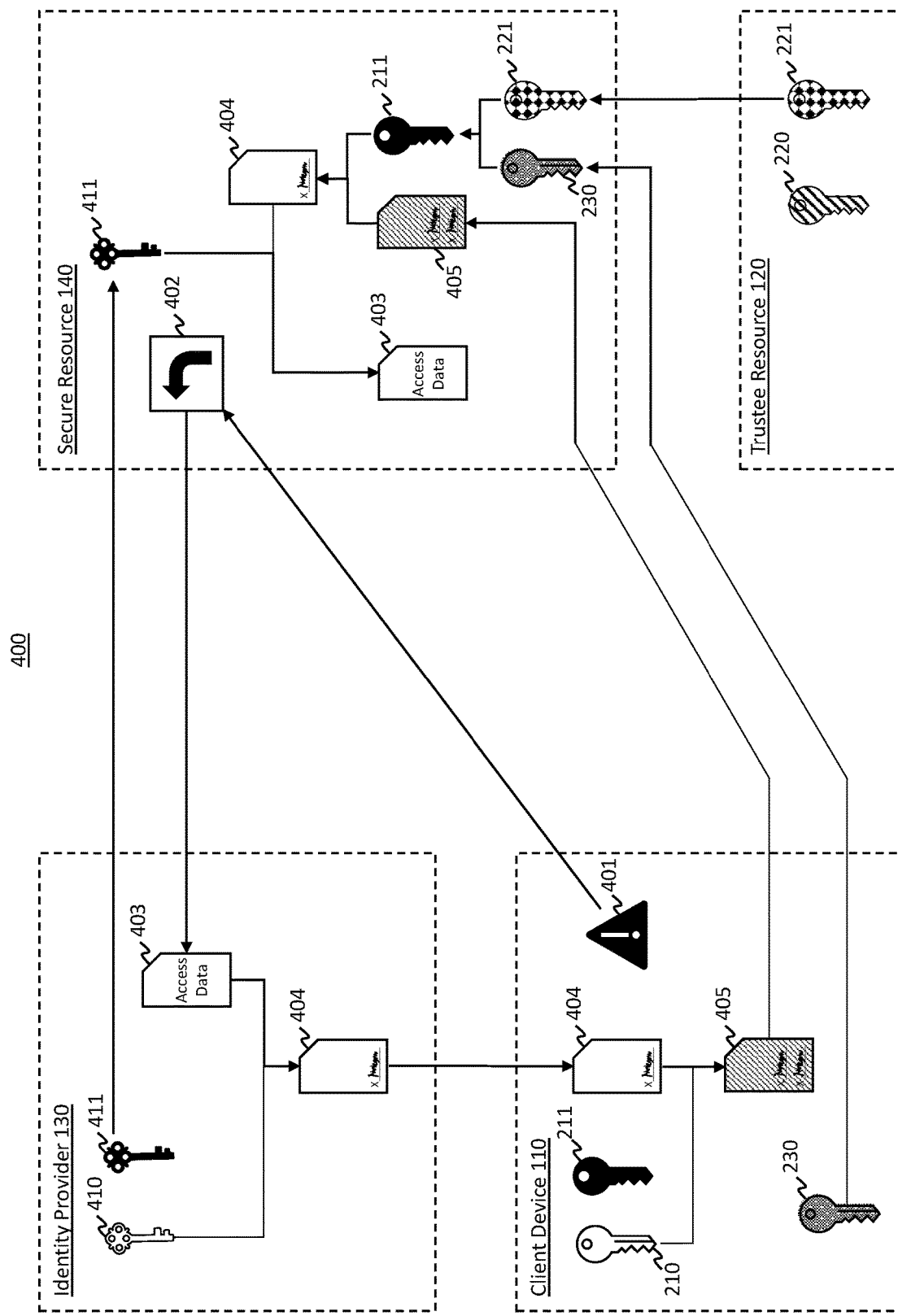
FIG. 4 is block diagram of an exemplary process for secure communications between clients and secure network resources in accordance with disclosed embodiments.

FIG. 4 is block diagram of an exemplary process 400 for secure communications between clients and secure network resources in accordance with disclosed embodiments. Process 400 may correspond to parts of processes 200 and 300 shown in FIGS. 2 and 3, respectively, and, accordingly descriptions of the components and processes therein may apply to process 400 as well. Process 400 may be triggered by client device 110 sending an authentication request 401 to secure resource 140.

Processes 200 and/or 300 described in FIGS. 2 and 3 may occur prior to execution of process 400. In other embodiments, all or parts of processes 200 or 300 may occur concurrently with parts of process 400. For example, client device 110 may send an authentication request 401 to secure resource 140 before, after, or at substantially the same time as it sends an authentication request 201 to trustee resource 120.

Upon receiving authentication request 401 from client device 110, secure resource 140 may redirect (402) client device 110 to identity provider 130. In some embodiments, identity provider 130 may request identity credentials from client device 110 in order to authenticate client device 110 (not shown). In such embodiments, for example, identity provider 130 may not proceed if client device 110 is not authenticated. Substantially as described above with respect to FIGS. 2 and 3, the credentials may comprise a variety of information corresponding to a user of client device 110, for example, a username and password, a personal identification number, or biometric data (e.g., a fingerprint, facial scan, eye scan, voice recording, and the like). In some embodiments, identity provider 130 may implement multi-factor authentication to authenticate a user. The credentials used by client device 110 to authenticate with identity provider 130 may be the same as or different from the credentials used to authenticate with trustee resource 120. For example, the credentials used to authenticate with identity provider 130 may be a traditional username and password (possibly with multi-factor authentication), but the credentials used to authenticate with trustee resource 120 may be biometric data, such as a user's fingerprint. In such cases, compromising trustee resource 120 may provide no advantage to an attacker because trustee resource 120 may only contain credentials that are only used to authenticate a user or users with trustee resource 120. Accordingly, an attacker gaining access to the trustee resource credentials could not use them to access identity provider 130.

Identity provider 130 may identify access data 403. Access data 403 may correspond to an identity associated with client device 110. Access data 403 may identify, for example, the identity, a level or type of the identity, privileges associated with the identity. In some embodiments, access data may comprise a token used to authenticate with secure resource 140.

Identity provider 130 may include an identity provider key pair including IdP private key 410 and IdP public key 411. Identity provider 130 may send the IdP public key 411 to secure resource 140. In some embodiments, secure resource 140 may receive the IdP public key 411 from identity provider 130 during an enrollment or initial trust establishment process. For example, identity provider 130 may send IdP public key 411 to secure resource 140 when a company associated with secure resource 140 enrolls with a service associated with identity provider 130. Secure resource 140 may then store and maintain IdP public key 411. In some embodiments, such an enrollment process may occur prior to execution of process 400.

Identity provider 130 may digitally sign access data 403. Identity provider 130 may use IdP private key 410 to digitally sign access data 403 to generate IdP-signed access data 404. Identity provider 130 may send IdP-signed access data 404 to client device 110. IdP-signed access data 404 may be sent in a communication to client device 110. In some embodiments, identity provider 130 may be configured to redirect client device 110 back to secure resource 140. In some cases, identity provider 130 may send a communication to client device 110 including both IdP-signed access data 404 and the redirect to secure resource 140.

Upon receiving IdP-signed access data 404, client device 110 may apply a second digital signature to IdP-signed access data 404. Client device 110 may use client private key 210 to apply the digital signature to create doubly-signed access data 405.

After signing IdP-signed access data 404, client device 110 may send doubly-signed access data 405 to secure resource 140. In some embodiments, client device 110 may send doubly-signed access data 405 as part of a second access request to secure resource 140. Client device 110 may also send digitally signed client public key 230 to secure resource 140. Client device 110 may send doubly-signed access data 405 together with digitally signed client public key 230 in the same communication to secure resource 140. In other embodiments, doubly-signed access data 405 and digitally signed client public key 230 may be sent to secure resource 140 in separate communications.

In order to verify the access data and authorize access to client device 110, secure resource 140 may verify both of the digital signatures applied to the access data using the public key corresponding to each of the digital signatures. Secure resource 140 may also verify the digital signature of digitally signed client public key 230 using trustee public key 221. If this digital signature is verified, secure resource 140 may proceed to use client public key 211 to verify the client's digital signature of doubly-signed access data 405.

Secure resource 140 may verify the digital signature applied by identity provider 130 using IdP public key 411. If both digital signatures applied to access data 403 are verified, secure resource 140 may utilize access data 403 and grant access to client device 110. As described above, access data 403 may indicate to secure resource 140 the level of privileges to grant to the identity associated with client device 110. Access data 403 may indicate a level of privileges by identifying a role or type of the identity (e.g., a super-user, administrator, root user, group member, etc.). For example, identity provider 130 may have multiple preidentified roles, and each identity may have an associated role. Accordingly, when identity provider 130 authorizes an identity associated with client device 110, it may determine the role associated with the identity and include the role in access data 403. Then, when secure resource 140 uses access data 403 to authorize access to the identity, it may grant the identity the privileges associated with the corresponding role identified in access data 403.

While FIG. 4 illustrates one trustee resource 120, in some embodiments, process 400 may be implemented with more than one trustee resource 120. For example, client device 110 may send client public key 211 to multiple different trustee resources 120. Each trustee resource 120 may digitally sign the key using its own unique trustee private key 220 and return a different version of signed client public key 230 (e.g., as illustrated by FIGS. 2 and/or 3 described above). Each trustee resource 120 may send its respective trustee public key 221 to secure resource 140. In such cases, client device 110 may send the plurality of signed client public keys 230 to secure resource 140. Secure resource 140 may then only grant access to client device 110 if it can verify the signatures on each of the signed client public keys 230 using the corresponding trustee public keys 221.

In some embodiments, identity provider 130 may include a plurality of IdP key pairs for applying digital signatures, each pair corresponding to a different IdP private key 410 and IdP public key 411. Accordingly, secure resource 140 may maintain a plurality of IdP public keys 411. Each of the plurality of IdP public keys 411 may correspond to an IdP private key 410 and may be used by secure resource 140 to validate digital signatures created with each of the IdP private keys 410. In some embodiments, the keys may be rotated over time or after each authentication request. In further embodiments, identity provider 130 may apply multiple digital signatures to access data 403 using multiple IdP private keys 410. In some embodiments, identity provider 130 may split access data 403 into multiple pieces or multiple communications, each piece being digitally signed by a different IdP private key. In either case, secure resource 140 may use the multiple IdP public keys 411 to verify each of the different digital signatures applied to access data 430 by identity provider 130.

In some embodiments, the digital signature of IdP-signed access data 404 may be valid indefinitely. In other embodiments, the digital signature may include an expiration attribute that indicates that the signature is valid for a limited period of time. Additionally, or alternatively, the digital signature may be valid for a number of uses, sessions, etc.

Figure 5:
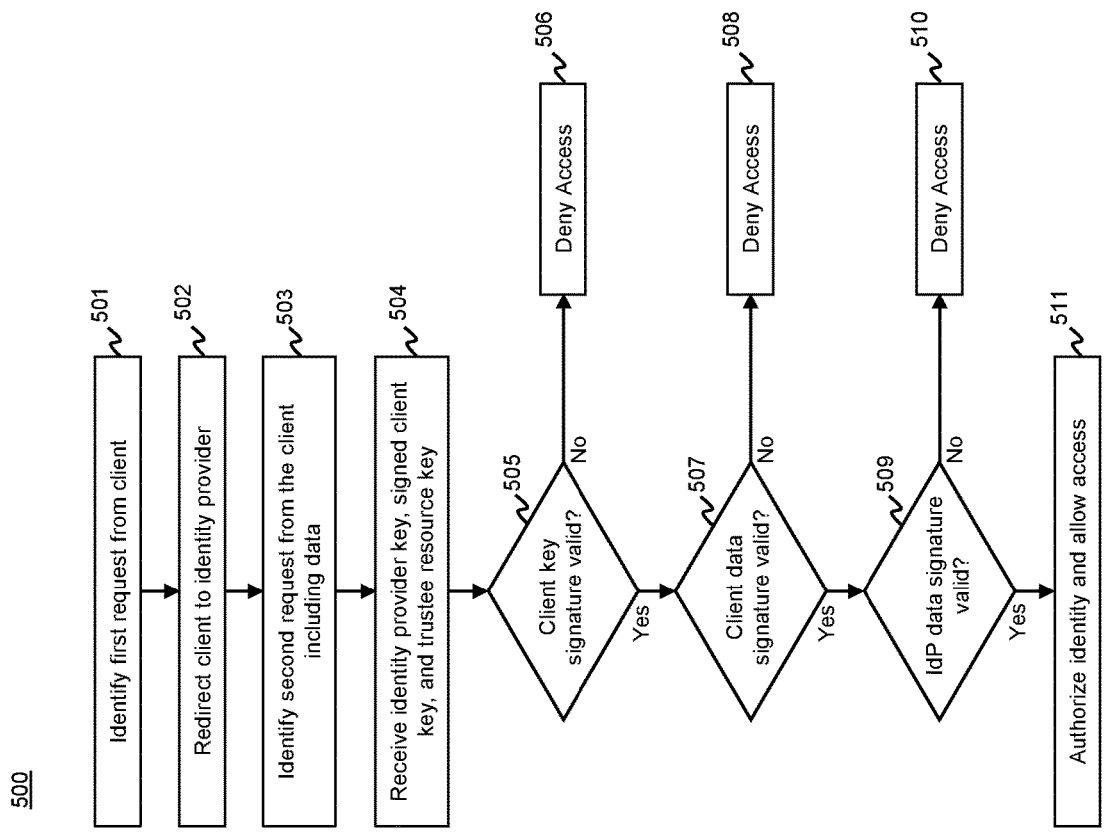
FIG. 5 is a flowchart depicting an exemplary process for secure communications between clients and secure network resources in accordance with disclosed embodiments.

FIG. 5 is a flowchart depicting an exemplary process 500 for secure communications between clients and secure network resources in accordance with disclosed embodiments. Process 500 may correspond to parts of processes 200, 300, and 400 shown in FIGS. 2, 3, and 4, respectively, and, accordingly descriptions of the components and processes therein may apply to process 500 as well. Process 400 may be triggered by client device 110 sending an authentication request 401 to secure resource 140. Process 500 may be executed by secure resource 140 to authorize access to identity associated with client device 110.

At step 501, process 500 may include identifying a first request from client device 110. For example, secure resource 140 may receive a request for access from client device 110.

At step 502, process 500 may include redirecting client device 110 to identity provider 130. In some embodiments, identity provider 130 may be configured to request identity credentials from client device 110 in order to authenticate client device 110. Upon receiving the credentials, identity provider 130 may authenticate the identity associated with client device 110. Upon authentication, identity provider 130 may identify access data 403 associated with the identity. As described above, access data 403 may indicate a level of privileges associated with client device 110. Access data 403 may indicate a level of privileges by identifying a role or type of the identity (e.g., a super-user, administrator, root user, member, etc.). Identity provider 130 may be configured to digitally sign access data 403 using IdP private key 410 and provide the resulting IdP-signed access data 404 to client device 110.

As described above, client device 110 may be configured to digitally sign IdP-signed access data 404 with client private key 410 to form doubly-signed access data 405. Client device 110 may be configured to send a second request to secure resource 140, which may include doubly-signed access data 405. Client device 110 may also send, in the request or in a separate communication, signed client public key 230 to secure resource 140.

At step 503, process 500 may include identifying a second request from the client including access data. For example, secure resource 140 may receive a second communication requesting access from client device 110. As described above, the second request may include doubly-signed access data 405.

At step 504, process 500 may include receiving an identity provider key, a signed client key, and a trustee resource key. Though described in a single step in FIG. 5, it is understood that IdP public key 411, signed client public key 230, and trustee public key 221, may be received at different times and in separate communications from different system components. For example, as described above, secure resource 140 may receive signed client public 230 from client device 110. In some embodiments, signed client public key 230 may be received from client device 110 in second access request received in step 503. Secure resource 140 may receive IdP public key 411 from identity provider 130. Similarly, secure resource 140 may receive trustee public key 221 from trustee resource 120. In some embodiments, secure resource 140 may receive multiple trustee public keys 221 from multiple trustee resources 120. After receiving the corresponding public keys, secure resource 140 may proceed to validate the digital signatures on access data 403 and client public key 211.

At step 505, process 500 may include validating the digital signature on signed client public key 230. Secure resource 140 may validate the digital signature on signed client public key 230 that was applied by trustee resource 120 using trustee public key 221. Secure resource 140 may be configured to deny access to client device 110 at step 506 if secure resource 140 is unable to validate the trustee's signature on signed client public key 230.

In some embodiments, secure resource 140 may receive multiple copies of signed client public key 230, each copy being signed by a different trustee resource 120. While FIG. 5 illustrates one trustee resource 120, in some embodiments, process 500 may be implemented with more than one trustee resource 120. For example, client device 110 may send client public key 211 to multiple different trustee resources 120. Each trustee resource 120 may digitally sign the key using its own unique trustee private key 220 and return a different version of signed client public key 230 to client device 110 (e.g., as illustrated by FIGS. 2 and/or 3 described above). Each trustee resource 120 may send its respective trustee public key 221 to secure resource 140. In such cases, client device 110 may send the plurality of signed client public keys 230 to secure resource 140. Secure resource 140 may then only grant access to client device 110 if it can verify the signatures on each of the signed client public keys 230 using the corresponding trustee public keys 221.

In other embodiments, secure resource 140 may receive a signed client public key 230 with multiple digital signatures applied by a plurality of trustee resources. Secure resource 140 may also receive a plurality of trustee public keys 221. Secure resource 140 may use each trustee public key 221 to validate the corresponding digital signature of signed public key 230. Just as with a single signature applied to signed client public key 230, if secure resource 140 cannot successfully validate each of the plurality of signatures, it may deny access to client device 110.

At step 507, process 500 may include validating the client digital signature on doubly-signed access data 405. Secure resource 140 may validate the client digital signature on doubly-signed access data 405, which was applied by client device 110, by using client public key 211. Secure resource 140 may be configured to deny access to client device 110 at step 508, if secure resource 140 is unable to validate the client's signature on doubly-signed access data 405.

At step 509, process 500 may include validating the identity provider 130 digital signature on doubly-signed access data 405. Secure resource 140 may validate the client digital signature on doubly-signed access data 405, which was applied by identity provider 130, by using IdP public key 411. Secure resource 140 may be configured to deny access to client device 110 at step 510, if secure resource 140 is unable to validate the identity provider's signature on doubly-signed access data 405.

Accordingly, if secure resource 140 cannot validate the digital signature on client public key 211 (applied by trustee device 120) and each of the two signatures on doubly-signed access data 405 (applied by identity provider 130 and client device 110), secure resource 140 may deny access to client device 110.

At step 511, process 500 may include authorizing the identity and allowing access. For example, if each of the three digital signatures is successfully verified in steps 505-509, secure resource 140 may authorize and grant access to the identity associated with client device 110. Secure resource 140 may grant access to client device 140 utilizing access data 403. As described above, access data 403 may indicate to secure resource 140 privileges to grant to the user, a role of the user, a level of privileges to grant to the user, etc.

While disclosed embodiments are described as implementing asymmetric (public/private key) encryption/signatures, it is understood that in some embodiments symmetric encryption may be implemented by one or more components of system 100. For example, client device 110 may implement symmetric encryption and have a single secret key, which it may use to encrypt IdP-signed access data 404. Client device 110 may send the key to trustee resource 120 for a signature and subsequently send only the signed version of the secret key to secure resource 140. Secure resource 140 could then validate the trustee resource 120 signature on the secret key and use the secret key to decrypt the client device's encryption of the access data. In some embodiments, symmetric encryption may also be implemented by one or more components of system 100 in addition to the asymmetric signature methods described above.

A potential use case of the disclosed embodiments is described below. It is understood that this use case is provided by way of example only and is not limiting of the present disclosure.

One potential implementation may be to provide an increased level of security to a service to manage identities associated with a large company's computing systems. The company's system (e.g., secure resource 140) may include a variety of different resources to which users may be granted access. Each user may have an identity that corresponds to certain privileges (or a level of privileges) that it may exercise within the system.

A user may use client device 110 to gain access to the company's system and secure resource 140. For example, the user may have installed a trustee resource 120 application on client device 110. Trustee resource 120 may use a secure enclave (e.g., Apple's Secure Enclave™, Google's Titan-M™, etc.) on client device 110 to generate and store a trustee private key 220 and corresponding trustee public key 221. Trustee resource 120 may also store authentication data (e.g., biometric data) of the user that it can use to authenticate the user.

When the user wishes to gain access to secure resource 140, the user may open trustee resource 120 application and provide authentication data, for example, a fingerprint scan. Trustee resource 120 may use the fingerprint scan to authenticate the user. Upon authenticating the user, trustee resource 120 may, through the secure enclave, access client public key 211 and apply a digital signature to client public key 211. The digital signature may be generated using trustee private key 220 to create signed client public key 230. Trustee resource 120 may also cause trustee public key 221 to be sent to secure resource 140. After receiving signed client public key 230, client device 110 may request access to secure resource 140.

Upon receiving the access request from client device 110, secure resource 140 may redirect client device 110 to identity provider 130. Identity provider 130 may be a third-party identity management service. The identity management service may also provide the trustee resource 120 application. Upon receiving the redirect of client device 110, identity provider 130 may request user credentials for authentication of the user. In response to receiving the user's credentials, identity provider 130 may authenticate the user and provide IdP-signed access data 404 to the client device. Identity provider 130 may create IdP-signed access data 404 by identifying access data 403 associated with the user and applying a digital signature to access data 403 using IdP private key 410.

After receiving IdP-signed access data 404, client device 110 may apply its own digital signature to it using client private key 210. Client device 110 may then send the resulting doubly-signed access data 405 to secure resource 140, along with signed client public key 230.

Secure resource 140 may (as described above with respect to FIGS. 4 and 5) use trustee resource public key 221 to validate the signature on signed client public key 230. Upon validating the trustee resource signature, secure resource 140 may use client public key 211 to validate the second-applied signature (applied by client device 110) of doubly-signed access data 405. Secure resource 140 may then validate the signature applied by identity provider 130 on access data 403. Upon validating these signatures, secure resource 140 may use access data 403 to grant appropriate access to the user of client device 110.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for secure and efficient communications between clients and secure network resources, the operations comprising:
   receiving an indication of a first request by a client to access a secure network resource;
   authenticating the client;
   identifying, based on the authentication, access data corresponding to the client and the secure network resource;
   signing the access data using a first identity provider key;
   providing, to the client, the signed access data;
   wherein the client is configured to:
      receive the signed access data;
      sign the signed access data using a first client key to form a doubly-signed version of the access data; and
      send the doubly-signed version of the access data to the secure network resource for verification; and
   sending, to the secure network resource, a second identity provider key corresponding to the first identity provider key; wherein the secure network resource is configured to:
      use the first client key and the second identity provider key to verify the signed access data; and
      grant access to the client based on the verification of the signed access data.

2. The non-transitory computer readable medium of claim 1, wherein receiving the indication comprises receiving a redirect from the secure network resource, the redirect comprising the indication.

3. The non-transitory computer readable medium of claim 1, wherein:
the client is configured to generate the first client key and a second client key as part of an enrollment process in a network environment including the secure network resource; and
the second client key corresponds to the first client key.

4. The non-transitory computer readable medium of claim 3, wherein the operations further comprise receiving the second client key from the client.

5. The non-transitory computer readable medium of claim 4, wherein the second client key is received as part of the enrollment process.

6. The non-transitory computer readable medium of claim 5, the operations further comprising:
signing the second client key using a trustee resource key; and
sending the signed second client key to the client device.

7. The non-transitory computer readable medium of claim 6, wherein, authenticating the client comprises:
receiving, from the client, the signed second client key;
verifying the signed second client key, using a second trustee resource key corresponding to the first trustee resource key.

8. The non-transitory computer readable medium of claim 1, wherein the first client key is based on at least one of: biometric data or biological data.

9. The non-transitory computer readable medium of claim 1, wherein the identity provider is further configured to redirect the client to the secure network resource.

10. The non-transitory computer readable medium of claim 9, wherein the redirect from the identity provider is part of a communication to the client that also includes the access data signed using the first identity provider key.

11. A computer-implemented method for secure and efficient communications between clients and secure network resources, the method comprising:
receiving an indication of a first request by a client to access a secure network resource;
authenticating the client;
identifying, based on the authentication, access data corresponding to the client and the secure network resource;
signing the access data using a first identity provider key;
providing, to the client, the signed access data;
wherein the client is configured to:
receive the signed access data;
sign the signed access data using a first client key to form a doubly-signed version of the access data; and
send the doubly-signed version of the access data to the secure network resource for verification; and
sending, to the secure network resource, a second identity provider key corresponding to the first identity provider key; wherein the secure network resource is configured to:
use the first client key and the second identity provider key to verify the signed access data; and
grant access to the client based on the verification of the signed access data.

12. The computer-implemented method of claim 11, wherein the client is configured to receive a plurality of signed versions of a second client key from a plurality of trustee resources, the plurality of signed versions of the second client key having been signed using a plurality of first trustee resource keys of the plurality of trustee resources.

13. The computer-implemented method of claim 11, further comprising maintaining a plurality of second identity provider keys corresponding to a plurality of first identity provider keys maintained by a plurality of identity providers.

14. The computer-implemented method of claim 11, wherein the operations further comprise:
receiving a second client key from the client as part of the enrollment process, the second client key corresponding to the first client key;
signing the second client key using a trustee resource key; and
sending the signed second client key to the client device.

15. The computer-implemented method of claim 14, wherein the signed version of the second client key has an expiration attribute.

16. The computer-implemented method of claim 14, wherein the signed version of the second client key has a number-of-use limitation.

17. The computer-implemented method of claim 14, wherein the signed version of the second client key is based on a network security policy.

18. The computer-implemented method of claim 14, wherein authenticating the client comprises:
receiving, from the client, the signed second client key;
verifying the signed second client key, using a second trustee resource key corresponding to the first trustee resource key.

19. The computer-implemented method of claim 11, wherein receiving an indication of a first request by a client to access a secure network resource comprises receiving a redirect of the client from the secure network resource, the redirect comprising the indication of a first request by the client to access the secure network resource.

20. The computer-implemented method of claim 11, wherein the secure network resource is configured to:
verify the first signature of the doubly-signed data using the second identity provider key;
verify the second signature of the doubly-signed data using the verified second client key; and
grant access to the client based on the verification of the first and second signatures.

* * * * *